May 1, 1928.
W. L. FLAGG ET AL
WHEEL STRIPING FIXTURE
Filed May 27, 1927
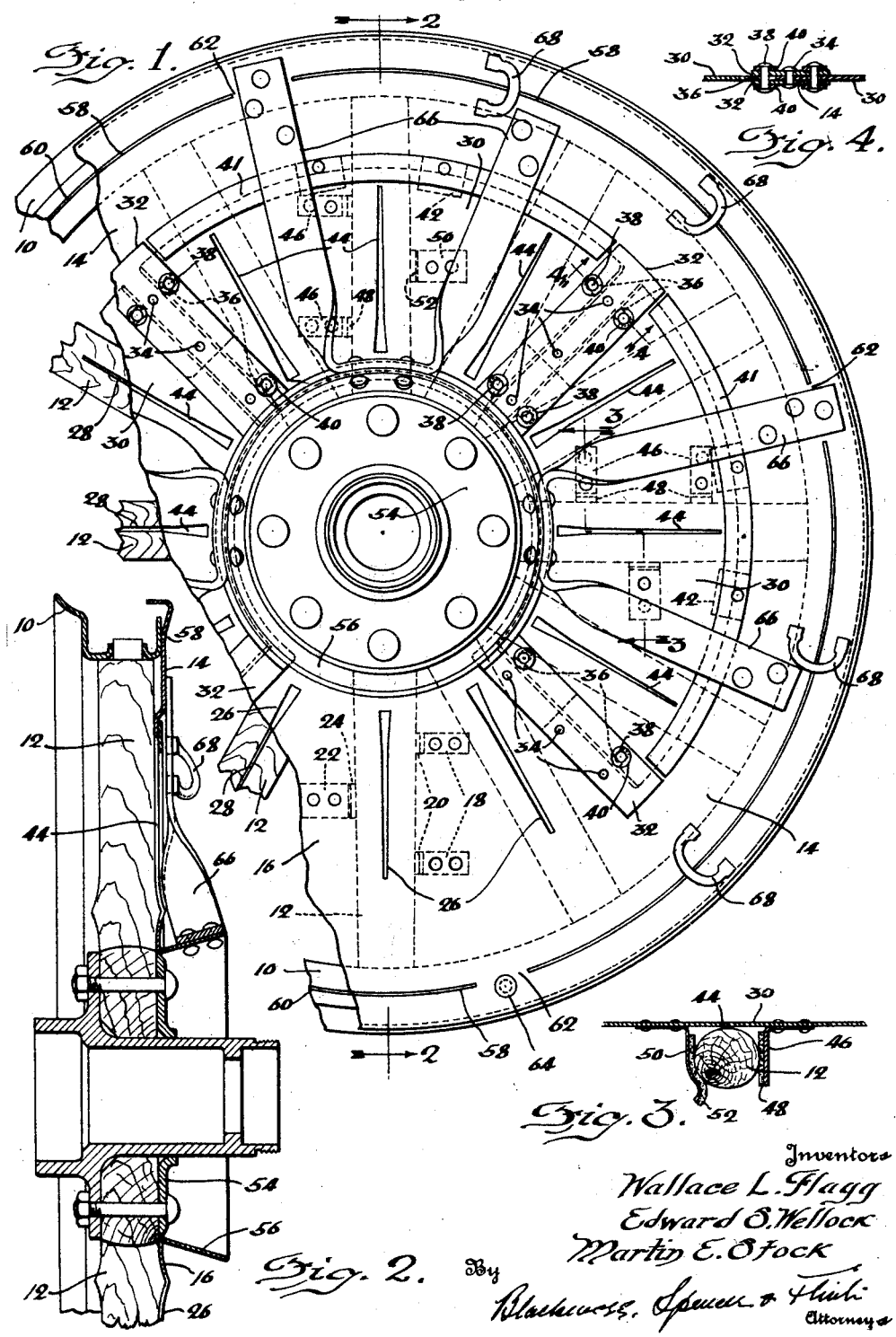

Patented May 1, 1928.

1,668,527

UNITED STATES PATENT OFFICE.

WALLACE L. FLAGG, EDWARD S. WELLOCK, AND MARTIN E. STOCK, OF DETROIT, MICHIGAN, ASSIGNORS TO GENERAL MOTORS CORPORATION, OF DETROIT, MICHIGAN, A CORPORATION OF DELAWARE.

WHEEL-STRIPING FIXTURE.

Application filed May 27, 1927. Serial No. 194,644.

Our invention relates to a device used in placing a stripe on the spokes of a vehicle wheel.

Our invention has for its principal object the provision of a fixture which may be secured to the spokes of a wheel to permit the spraying of a stripe on the center line of each spoke. Ordinarily this stripe is put on by hand, but this requires skilled labor and is therefore expensive. By spraying the stripe on, ordinary labor may be used and the cost cut down.

It is a well recognized fact that due to large production methods and other reasons, the spacing in the spokes of one wheel may vary considerably from another. Therefore, any device intended for use in connection with wheel spokes, should be so constructed that variations in the spoke spacing may be compensated for.

Therefore, a second object is to provide a striping fixture in which the part covering the spokes and containing the slots through which the stripes are sprayed, is divided up into several sections, movable relative to each other. Each one of these sections is attached to an adjacent spoke and, upon being attached, automatically adjusts itself to a position which will cause the other slots in this particular section to come as near as possible to the center lines of their respective spokes.

Another object is to provide such a fixture in which the stripe around the felloe portion of the wheel may be sprayed at the same time as the spokes.

A still further object is to provide a fixture in which the spokes are separated from the hub of the wheel by a partition or flange, so that the wheels may be striped one color and the hub sprayed another color, without removing the fixture.

With the above and other objects in view my invention will be more clearly understood by referring to the specification and accompanying drawing, in which:

Fig. 1 is a fragmentary elevation of a wheel, showing my improved striping fixture secured thereto.

Fig. 2 is a section taken on the line 2—2 of Fig. 1.

Fig. 3 is a section taken on the line 3—3 of Fig. 1.

Fig. 4 is a section taken on the line 4—4 of Fig. 1.

The reference numeral 10 indicates the felloe of a wheel having spokes 12. Placed over the wheel is a disc 14 having a portion 16 secured to one of the spokes by clips made up of rigid members 18 covered with resilient material 20, and a spring member 22 covered with resilient material 24. It will be understood of course, that the wheel has been previously finished and it is necessary to protect the spokes from becoming scratched. Both of the members 18 and 22 are riveted or otherwise secured to the portion 16 and serve to hold the latter tightly against the spoke. Slots 26 permit the spokes covered by the portion 16 to be striped as at 28 by spraying.

As stated before, the spacing between the spokes is apt to vary and even though the variation should only be a small fraction of an inch for any one spoke, it might add up to a considerable variation after going around the wheel, and consequently the stripe might not come near the center line of the spoke and would not be satisfactory. To meet this situation, we have provided three sections 30 which are held in the disc 14 by plates 32, secured to each side of the disc by rivets 34. The ends of the sections 30 have slotted holes 36 through which pass rivets 38. These rivets are provided with washers 40 and are held in the plates 32 without actually clamping the plates together, so that the sections 30 may be free to slide between the plates. Curved plates 41 are riveted to the disc to hold the sections in place and also to cover up the crack between the disc and the section to prevent any of the finish from passing through this crack. Lugs 42 are mounted on the inner side of the disc to hold the sections in from that side.

Each of the section 30 is provided with slots 44 through which a stripe may be sprayed upon a spoke. Carried by each section are rigid members 46 covered with resilient material 48 and a spring member 50 covered with resilient material 52. These members serve a double purpose. They hold the fixture as a whole in place against the wheel and also serve to center the slots of each section over the particular spokes which that section covers. It will be seen that it is impossible to have a variation of any great amount as it can only be the variation of one spoke, which is not noticeable. If, however, the fixture were not adjustable and were fastened to one spoke, the cumulative variation might develop into quite an amount, and would be very noticeable.

It is sometimes considered desirable to finish the hub of the wheel in a color different from that of the spokes and felloe and also different from the color that the spokes are being striped. Therefore, a large central opening is provided in the disc 14 and is of the same diameter as the hub 54. A slightly tapered flange 56 is secured to the disc around this opening. This flange prevents any of the hub color finish from getting into the slots 26 or 44 and then on the spokes. It also prevents any of the finish being used to stripe the spokes from getting on the hub.

Around the edge of the disc a slot 58 is provided to permit the spraying of a stripe 60 on the felloe 10. This slot is interrupted at points 62 so that the disc 14 may be made in one piece. These points 62 are so arranged that they come opposite the points on the felloe where the rim securing bolts and lugs are located and consequently it is not necesary to continue the stripe at these points. A dowel pin 64 secured in the disc, is adapted to fit into one of the rim bolt holes in the felloe, for the purpose of properly locating the fixture with respect to the wheel as a whole. This is necessary in order to bring the points 62 opposite the rim bolt holes. Twisted bars 66 are riveted to the disc 14 and to the flange 56 and serve to strengthen the fixture and to keep it true. U-shaped members 68 are secured to the disc on each side of the slot 58 for the purpose of preventing the disc from "waving" or becoming offset at the slot, thus spoiling the appearance of the stripe. These members are curved up away from the disc in order to permit spraying under them so that the stripe may be continuous at these points.

It is thought from the foregoing taken in connection with the accompanying drawing that the construction and operation of the device will be apparent to those skilled in the art, and that various changes in size, shape, and proportion and details of construction may be made without departing from the spirit and scope of the appended claims.

We claim:

1. A striping fixture comprising, a fixed section, and one or more sections movable relative to said fixed section to compensate for variations in the part to be striped.

2. A striping fixture comprising, a fixed section, and section movable relative to said fixed section and to each other to compensate for variations in the part to be striped.

3. A striping fixture comprising, a section adapted to be secured to the article being striped, and one or more sections movable relative to said first named section to compensate for variations in the article being striped.

4. A striping fixture comprising, a section adapted to be secured to the article being striped, and one or more adjustable sections provided with means to engage said article, said adjustable sections being movable relative to the first named section to compensate for variations in the article being striped.

5. A striping fixture comprising, a plurality of sections containing slots, and means to secure said sections to the article being striped, said sections being movable relative to each other to compensate for variations in the article being striped.

6. A striping fixture comprising, a disc adapted to be secured to the article being striped, and movable sections held in said disc and adjustable by engagement with the article being striped to compensate for variations in the latter.

7. A striping fixture comprising, a disc adapted to be secured to an article having a plurality of portions to be striped, and adjustable means covering said portions and movable by engagement with the latter to compensate for variations in the spacing of said portions.

8. A wheel striping fixture comprising, a disc adapted to be secured to the wheel spokes, and adjustable sections held in said disc and adapted to engage said spokes.

9. A wheel striping fixture comprising, a slotted disc adapted to be secured to one of the wheel spokes, and sections held in said disc and adapted to engage other spokes and be moved with respect to each other to compensate for variations in the spacing of said spokes.

10. A wheel striping fixture comprising, a disc provided with slots to permit the striping of the wheel felloe and slots to permit the striping of a portion of the wheel spokes, and movable slotted sections permitting the striping of the balance of the spokes, said sections being held in said disc and being adjustable by engagement with said spokes to compensate for variations in the spacing of the latter.

11. A wheel striping fixture comprising, a slotted disc having a central opening, said disc being adapted to be secured to the wheel spokes, movable slotted sections held in said disc, and a flange secured to the inner periphery of said disc, said flange serving to prevent the hub finish from getting on the spokes.

12. A fixture for spraying finish on a wheel comprising a disc having a central aperture adapted to fit the hub of a wheel to be finished and a plurality of radial slots disposed so as to be respectively opposite the spokes in the wheel and an annular flange projecting laterally from said disc at said central aperture to prevent intermixture of the finishing materials to be sprayed through the slots and aperture respectively.

In testimony whereof we affix our signatures.

WALLACE L. FLAGG.
MARTIN E. STOCK.
EWARD S. WELLOCK.